3,229,245
ECHO RANGING DISPLAY SYSTEM
Burton G. Hurdle, Alexandria, and Robert J. Mackey, Jr., Falls Church, Va., assignors to the United States of America as represented by the Secretary of the Navy
Filed Apr. 30, 1959, Ser. No. 810,193
4 Claims. (Cl. 340—3)
(Granted under Title 35, U.S. Code (1952), sec. 266)

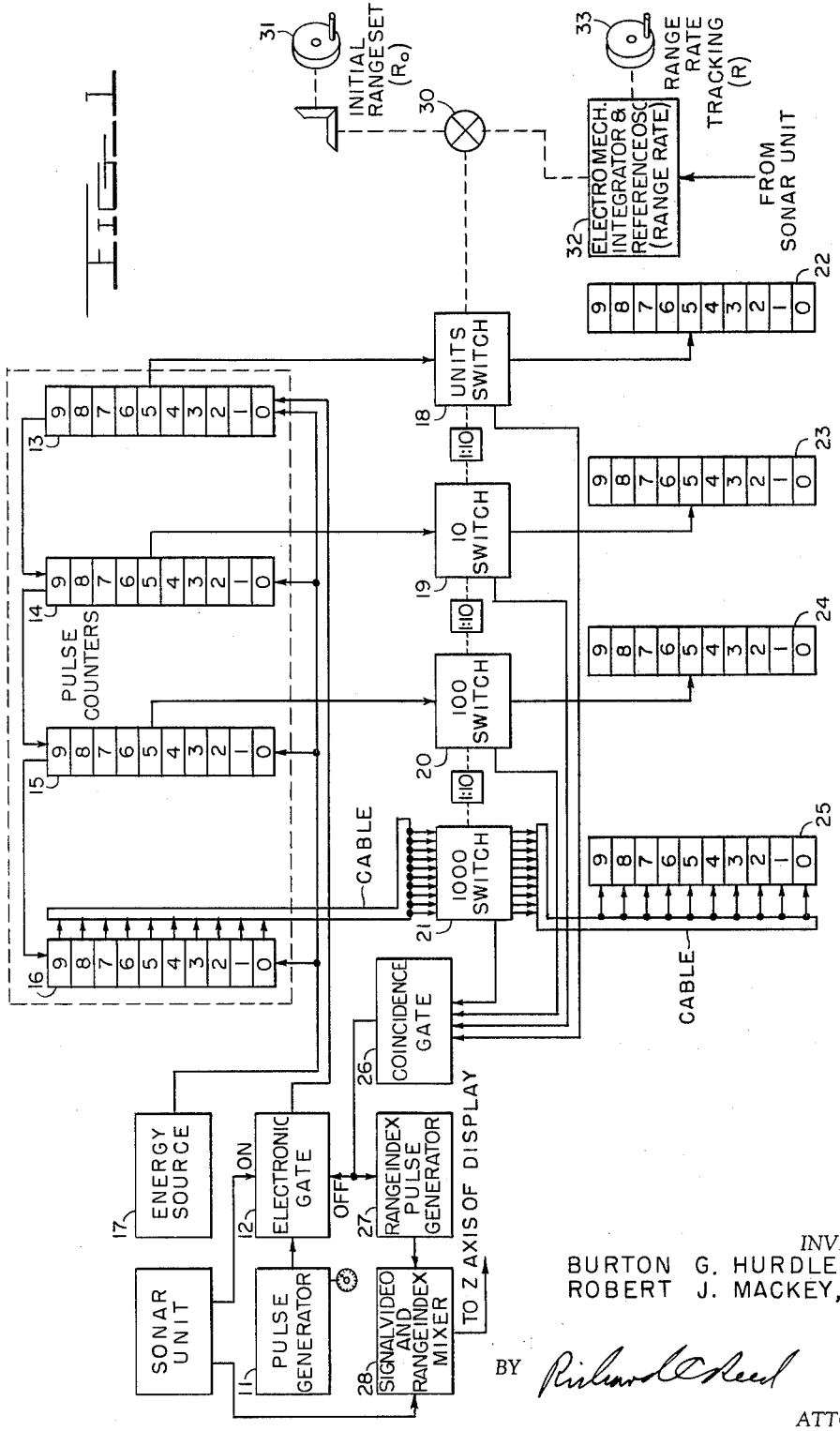

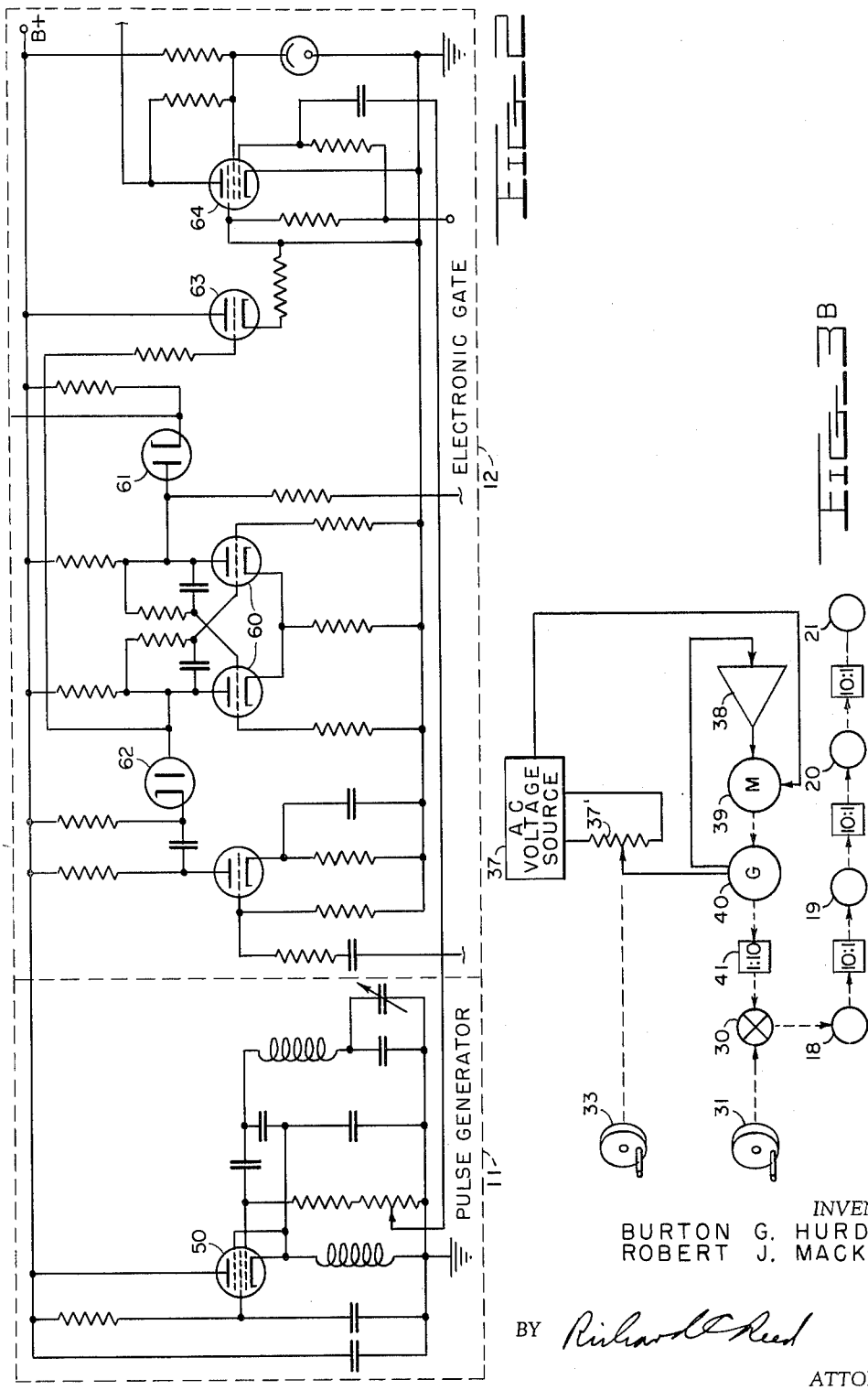

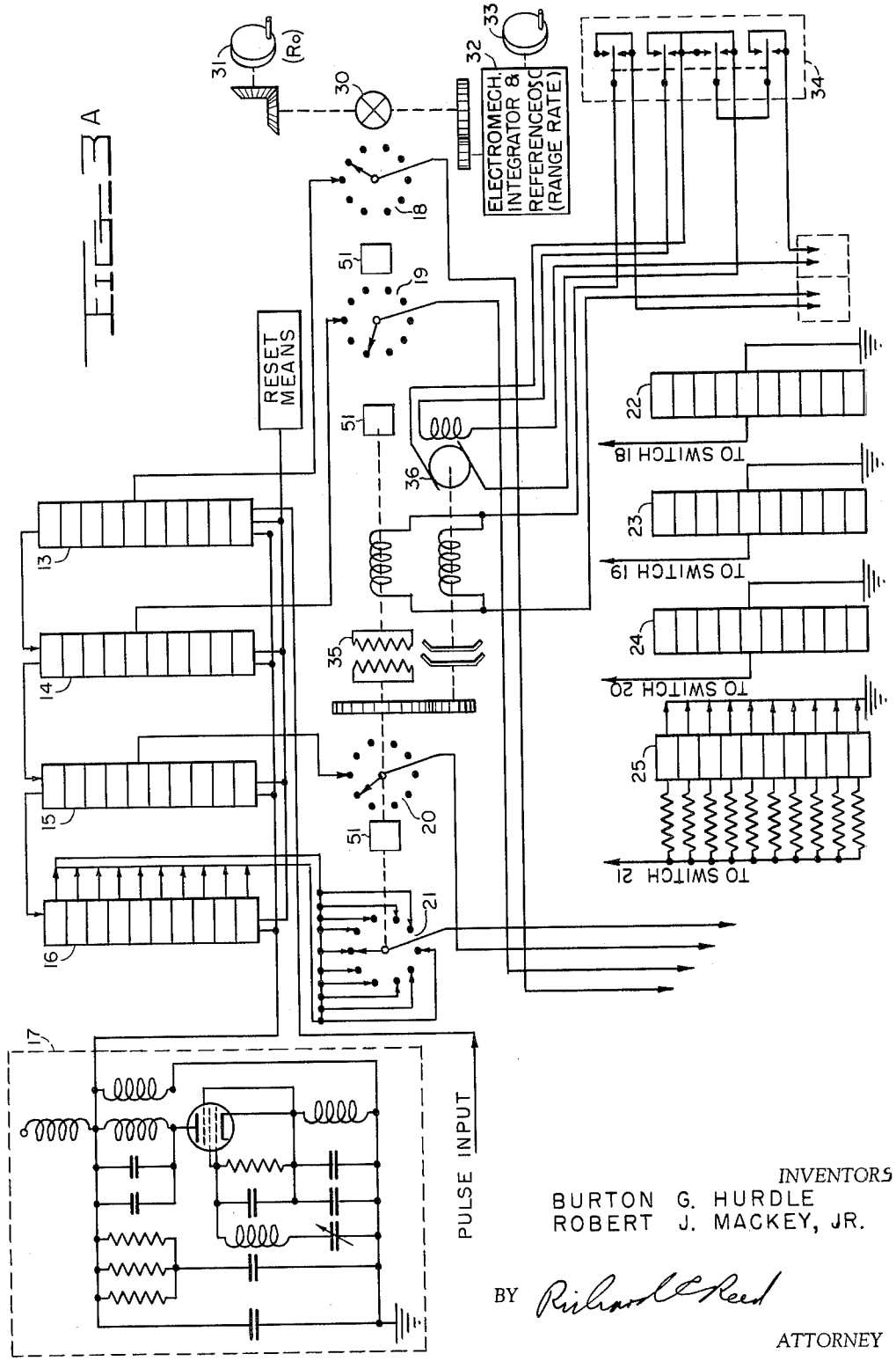

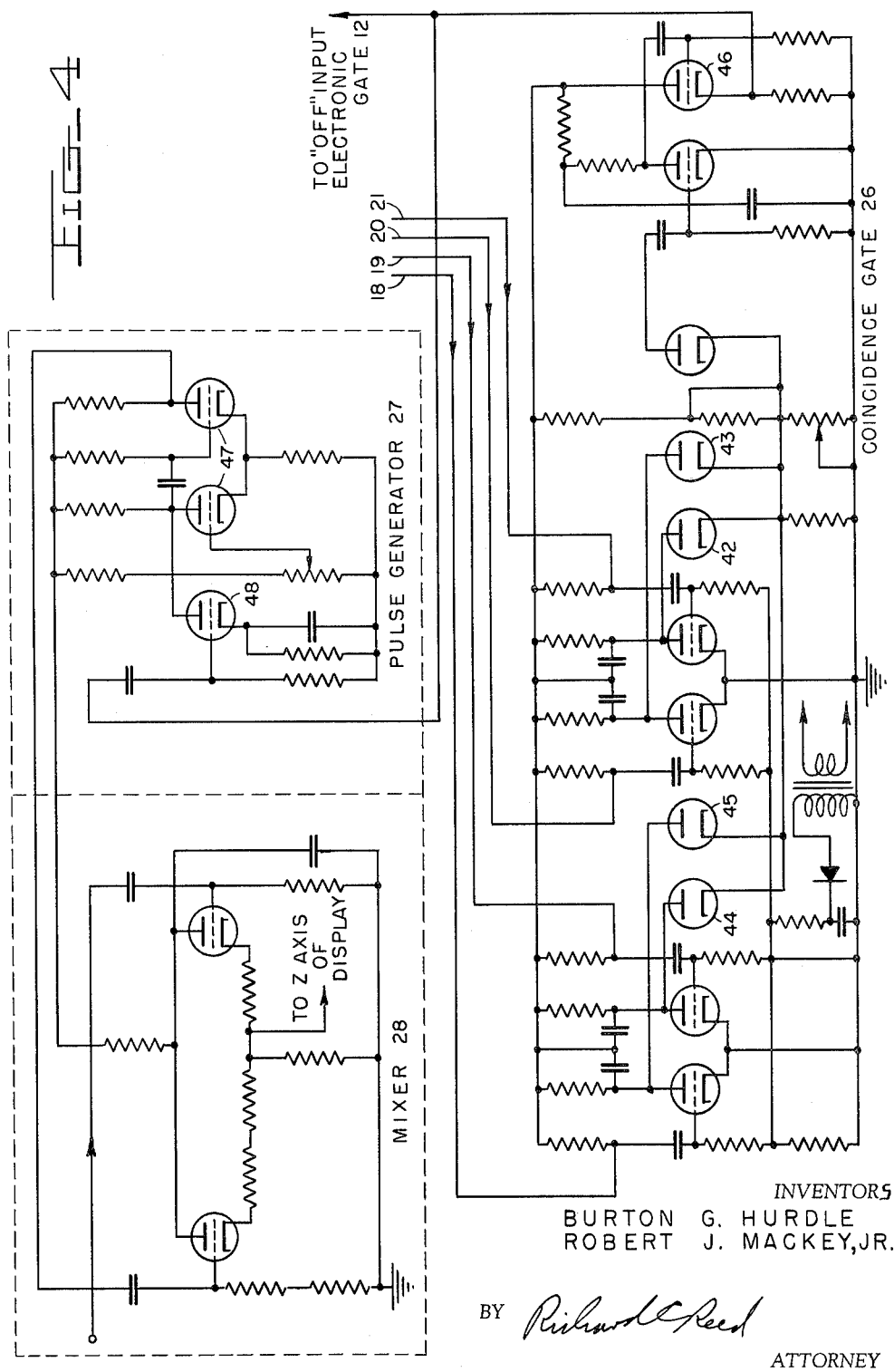

The invention described herein may be manufactured and used by or for the Government of the United States of America for governmental purposes without the payment of any royalties thereon or therefor.

This invention relates in general to echo ranging systems and in particular to digital display means for use with such systems.

In echo ranging systems of the sonar variety it is common practice to transmit a pulse train and then to compare the received echo pulse train with the original. This comparison may involve the time interval between transmission and reception and/or it may involve a cycle to cycle phase comparison. Cathode ray presentation techniques are frequently employed to visually display the range information and the visual display on the cathode ray screen is analyzed by the operator of the system. It will be appreciated that the analysis of the visual display introduces a significant operational delay in such systems and that this operational delay is highly undesirable in modern day applications.

Accordingly,

It is an object of this invention to provide an instantaneous digital measurement of range information.

It is still another object of this invention to provide an accurate digital display of range information.

It is a further object of this invention to provide a range information display which affords a simplified target tracking procedure.

Other objects of this invention will become apparent upon a more comprehensive understanding of the invention for which reference is had to the following specification and drawings wherein:

FIG. 1 is a showing in block diagram of the digital information display system of this invention in its preferred embodiment;

FIG. 2 is a schematic showing of several components of the embodiment shown in FIG. 1;

FIGS. 3a and 3b are schematic showings of several other components of the embodiment shown in FIG. 1; and FIG. 4 is a schematic showing of still other components of the embodiment shown in FIG. 1.

Briefly, this invention is an electronic chronometer system which provides a digital display of the propagation time interval between particular portions of the transmitted sonar pulse and the received target echo. The system permits the insertion of instantaneous range rate information. That is, if the target is moving with respect to the sonar unit, and range rate information is available, the system may be utilized to "track" the target and provide a compensated range indication at any given instant in time. Structurewise, the system includes a pulse oscillator, an electronic pulse counter and an electromechanical switching means with selected gating circuitry for initiating and interrupting the operation of the system.

In FIG. 1, a pulse generator 11 is connected via the electronic gate 12 to the pulse counter arrangement which is indicated within the dotted lines.

The pulse generator 11 produces a pulse train having a selected interval between pulses. In a sonar application this time interval may be proportional to the time required for wave energy to be propagated a distance of one yard in a prescribed medium, generally water. The pulse counters which are identified as 13, 14, 15 and 16 may be either of the binary or the decade variety with any desired scale. It is essential that each of the pulse counters have an individual output per a selected number of pulses and that it can be reset following each complete count. Four decade counters having an individual output per each pulse are shown in FIG. 1 in a units, tens, hundreds and thousands counter arrangement. It is understood, of course, that this invention is not limited to a four-counter arrangement and that a greater or lesser number of counters may be employed, as desired.

An energy source 17 is shown connected to each of the pulse counters 13, 14, 15 and 16. The signal from the energy source 17 appears at a significant output terminal of each counter. The particular output terminal at which the signal appears is determined by the number of pulses received from pulse generator 11.

Each of the counters 13, 14, 15 and 16 is connected to a separate mechanical switch identified as 18, 19, 20 and 21, respectively. Each of the mechanical switches 18–21 has a selected number of positions equal in number to the number of outputs in its respective counter. In this case each switch has 10 outputs. For purposes of simplicity only one electrical cable connection between the counter 16 and the switch 21, is shown in detail. As indicated in the drawing, each counter output has a separate connection such that each of the outputs from the counter 16 is connected to a different position on the switch 21. While the switches 18–21 are indicated as rotary switches having a common axis, it is understood, of course, that this invention is not limited to rotary switches in such an arrangement and that other types of switches might be substituted as desired. Associated with each of the switches 18–21 is a visual numerical indicator which is indicative of the position of the rotary contact in its respective switch. These visual indicators, which are identified as 22, 23, 24 and 25 in the drawing, may be, for example, neon lamp displays. It will be appreciated that any suitable means may be employed to energize the individual lamps in the lamp displays.

The output of each of the switches 18–21 is taken via their rotary contacts and each of these outputs is connected to a separate input of coincidence gate circuit 26 which is responsive only to the reception of the output of the signal source 17 at each of its four inputs.

The output of the coincidence gate circuit 26 is connected to a range index pulse generator 27 and to the electronic gate 12. When the signal from energy source 17 is received at each of its four inputs, the coincidence gate 26 sends a pulse to the timing gate 12 which thereupon cuts off to stop the count. At the same time the pulse generator 27 is activated by the output of coincidence gate 26 to produce a pulse signal which is applied, via the mixer 28, to the Z axis of a CRT strip display. The mixer 28, which is also connected to the sonar unit as shown, serves to combine the pulse signal from generator 27 with the signal video from the sonar unit to produce a Z axis modulation.

The position of each of the four decade range switches 18–21 is controlled by the rotary output of a mechanical differential 30 which operates to add the two rotary inputs shown. As shown in the drawing one of these rotary inputs represents the initial range set control 31 and the other is connected to an electromechanical or other suitable type integrator 32 which converts range rate information into rotary motion. A hand crank control 33 is shown on the integrator 32 which permits compensation for variations in range rate. It will be appreciated that this hand crank may be mechanically geared to any range rate tracking device to operate in accordance therewith.

In operational analysis of the system shown in FIG. 1, the initiating event is the reception of the sonar synchronizing pulse at a selected indexing point, for example, the leading edge of the transmitted sonar ping. This pulse, which may be delayed by conventional means, not shown, to compensate for mechanical reset delays, is passed to the electronic gate 12. The arrival of the pulse at the gate 12 promptly turns it on and allows the output of the pulse generator 11 to pass to the units. Since the sole function of the pulse generator 11 is to produce pulses to be counted, it will be appreciated that the type of pulse generator employed must be correlated with the type of counter employed. For example, if the counters only respond to pulses having sharp leading edges, then the pulse generator 11 should produce such pulses, or alternatively, conventional means might be incorporated for reshaping the pulses produced by the pulse generator. With the gate 12 "on" the counters begin to count each cycle of the output of the pulse generator 11 and as the counting progresses each digit of the four decade counters produces an output for the time period during which the count is on a particular digit. For example, the counter 14 produces an output at a selected digit terminal for the period of time required for 10 pulses to enter the counters before moving on to the next digit terminal to be counted. Likewise the counter 15 produces an output at a selected digit terminal for the period of time required for 100 pulses to enter the counters before moving on to the next digit terminal.

The outputs from the four decade counters 13, 14, 15 and 16 are fed to corresponding input terminals on the four decade rotary switches, 18, 19, 20 and 21 respectively. When the count reaches that count set in on the switches, there is simultaneous output from all switches. Their coincidence is detected in the coincidence gate 26 and a pulse is sent back to the gate 12, cutting it off and stopping the count. Simultaneously, the coincidence gate 26 transmits a pulse to the range index pulse generator 27 where it is processed for mixing with the signal video and applied to the Z axis of a cathode ray tube or to some other display or processing system.

The exact range of the target in yards is read from the bank of neon lamps 22, 23, 24 and 25 and held in the counters until the next reset pulse.

The rotary position of each of the four decade range switches 18, 19, 20 and 21 is controlled by the output of a mechanical differential 30 which adds the inputs from the initial range set control 31 and the output of the velocity servo. As the range rate changes in accordance with the variation in relative rate of speed, the velocity servo continuously imparts new input information to the mechanical differential which, in turn, changes the position of the rotary decade switches correspondingly.

The system exemplarily shown in FIG. 1 can be more fully understood by reference to the FIGS. 2, 3 and 4 which illustrate the various circuitry which might be employed therein.

FIG. 2 is a more detailed showing of the pulse generator 11 and gate 12 circuitry of FIG. 1. The pulse generator 11 is shown as a modified Clapp oscillator, which may be varied in frequency to compensate for propagation time variations caused by changes in water temperature or other factors. In addition this oscillator may be automatically varied by a function generator, not shown, to compensate for nonlinear or time dependent variations of range caused by the medium. In such an arrangement the function generator would be synchronized with the "on" signal to the electronic gate 12 to operate in accordance therewith. The required period T of the oscillator is given by the equation $T = 2\delta R/C$ where R is the smallest increment of range to be measured (yards/sec.). The multiplier 2 in the above equation takes into account the two-way propagation time for echo ranging.

While a wide variety of oscillators might be employed as the timing standard in this invention, the particular oscillator shown, which incorporates a 6CB6 pentode 50, was selected for its stability under operative conditions. For example, the oscillator shown permitted as much as 10 percent variation in plate and filament voltages with maximum range error of approximately ±0.1 yard for a 10 sec. interval or 800-yard range measurement, while tube changes had virtually no effect on range measurement. Since the least count of the range measurement is ±1.0 yard, the ±0.1 yard error was insignificant.

The gate 12 is shown as a bistable multivibrator 60 utilizing both triode sections of a 12AT7 with "on" pulse input to one triode via a decoupling diode 61 and "off" pulse input to the other triode via another decoupling diode 62. The output of the multivibrator is applied via a cathode follower 63 to the gate tube 64. It will be appreciated that this gating circuitry may be replaced by any suitable gating circuitry which responds in the proper manner to provide an on-off function in this invention.

FIG. 3a is a more detailed showing of the arrangement of the pulse counters 13, 14, 15 and 16, the oscillator 17 and the switching mechanism 18, 19, 20 and 21 together with the control therefor. In this more detailed showing the pulse counters are, for example, of the saturable reactor type and contain no vacuum tubes. The four counters have a maximum counting range of 9999 and are adapted to hold the count at any point until the next pulse to be counted is inserted.

The saturable reactor type of counters shown, which may be National Cash Register DSA110 or the equivalent, have been found to operate best on short positive pulses. Consequently, it has been found advisable when using a sine wave generator to incorporate a conventional pulse forming means which might be, for example, a keyed blocking oscillator with a cathode follower output, to alter the form of the sine wave output. It will be appreciated that this conventional pulse forming means might be incorporated as a part of the pulse generator or as a separate element intermediate the pulse generator and the counters. Obviously such pulse shaping techniques need not be employed where the pulse generator and the pulse counters are ideally matched. It will be appreciated that in addition to saturable reactor type counters, other types of counters, for example Hewlett-Packard Type AC 4A, might be employed in the device of this invention.

The energy source 17, like the pulse generator 11, is shown as a modified Clapp oscillator. In the depicted embodiment, the output frequency is arbitrarily set at 500 kc. It will be appreciated that a wide variety of energy sources might be substituted for the oscillator 17. In the case of an energy source having an alternating output it is essential, however, that the length of the RF pulses produced thereby is equivalent to the least count or the period of the pulses being counted. This frequency limitation applies, of course, to a system wherein each pulse is counted individually. Where groups of pulses are counted rather than individual pulses, the appropriate multiple should be applied to the above said frequency limitation.

Each of the 40 counter digits is brought out individually to a corresponding switch position on its respective range selector switch. The range selector switches consist of four 10 position rotary switches mechanically connected by means of a Geneva-type 10:1 reduction gear 51 between each switch. The switches are connected such that for every complete turn of the units switch, the tens switch turns one tenth turn in step fashion and the hundreds and thousands switches operate in a like manner. The position of the rotary contact of each of the switches is visually indicated on the neon lamp indicators 22–25.

The initial range set on the switches 18, 19, 20 and 21 is provided by two controls, the R$o$ handwheel 31 and R'$o$ slew switch control 34. For coarse range-set the R'$o$ solenoid operated slew switch control 31 is employed to enable rapid target range acquisition. In operation, the slew control disconnects the mechanical link 35 between the tens and hundreds switches and simultaneously connects a motor 36 to the hundreds switch shaft causing the hundreds and thousands switches to be rapidly rotated. For fine range-set the R$o$ handwheel control 31 which operates through the mechanical differential 30 is rotated at 10 yards per revolution, to drive the units switch. Obviously, it is not essential to the device of this invention that both a coarse and a fine range-set control be provided. It has been found, however, that two initial range-set controls, as shown, greatly improves operational performance. In particular, versatility of the device is improved along with faster activation or response time.

A third range-set control 33, which also operates through the mechanical differential 30, is provided to compensate for continuous changes in range at a determined rate of change. This control is termed the range rate control. In the more detailed range set arrangement shown in FIG. 3b, the range set control 31 is directly connected and the range rate control is indirectly connected, via a tachometer system to the mechanical differential 30 which controls the position of the variable contact in each of the switches 18, 19, 20 and 21.

In the tachometer system shown in FIG. 3b, the range set control 33 is mechanically connected to variable potentiometer 37' to vary the output of A.C. voltage source 37. The output of the A.C. voltage source 37, taken at the variable contact on potentiometer 37' is electrically connected via the tachometer 40 to the input of amplifier 38 which drives the control field of the two-phase servo motor 39 such that the speed and direction of the motor 39 is determined by the amplitude and phase of the output of amplifier 38. As shown in the drawing the tachometer 40, an induction generator, is mechanically connected to the shaft of the motor 39. Thus the tachometer 40 generates an A.C. voltage proportional to motor speed. Since the output of tachometer 40 contributes to the control voltage fed to the motor 39 by amplifier 38, the motor runs at the speed called for by the control voltage irrespective of variations in power supply, mechanical load, and power frequency. Of course, in such an arrangement, it is important that the motor and generator fields and the control signal are all supplied by the same 60-cycle power source.

In FIG. 3b the shaft of motor 39 is connected through a reduction gearing 41 and the differential 30 to the units switch 18 driving it at a speed proportional to range rate. It will be appreciated that the effect is the same as if the range set control 33 were turned at a constant rate, thus moving the switches at a speed proportional to range rate.

FIG. 4 is a more detailed showing of the coincidence gate 26, pulse generator 27, and the mixer 28. In this more detailed showing, the outputs of the switches 18, 19, 20, 21, taken via the rotary contacts, are each applied to separate inputs of the coincidence gate 26. In FIG. 4, the output of oscillator 17 appears at each of the coincidence gate inputs. Each of the 500 kc. signals is amplified and rectified before insertion into its respective one of the coincidence diodes 42, 43, 44, 45. Within the coincidence gate a coincidence pulse is produced when the four amplifier plate voltages drop and the diodes conduct and this coincidence pulse is first amplified and then relayed via a cathode follower 46 to the "off" input of the multivibrator in electronic gate 12 to interrupt the transmission of the pulse signal output of range oscillator 11 to the pulse counters. The coincidence pulse output of the coincidence gate 26 is also fed to the input of range index pulse generator 27.

Range index pulse generator 27 comprises a multivibrator 47 and a trigger tube 48 which initiates action therein. The output pulse from the range index pulse generator is then fed to a mixer stage 28 in the form of a cathode follower adder, where it is mixed with signal video pulses from the sonar unit and then inserted in the Z axis of the CRT display. It will be appreciated that the output of the range index pulse generator 27 may also be utilized to actuate other complementary equipment for example, a data recording camera.

It will be appreciated that the circuitry particularly described in FIGS. 2, 3 and 4 is peculiar to one operative embodiment of this invention and that many alterations of the specifically disclosed circuitry are permissible without extending the purview of the invention. For example, the coincidence gate 26 circuitry was selected in accordance with the type of signal produced by the energy source 17. As pointed out previously, the energy source 17 may produce a wide variety of different output signals. Thus, the coincidence gate systems employed in this invention to indicate the simultaneous presence at the four inputs thereof may vary accordingly.

Likewise, the position indicating means 22, 27, 24 and 25 connected to the switches 18, 19, 20, 21 may be mechanically, electrically or otherwise adapted to automatically feed representative digital information to a remote point, for example, a fire control station.

Finally, it is understood that this invention is to be limited only by the scope of the claims appended hereto.

What is claimed is:

1. A range measurement system for use in a pulse echo search apparatus wherein the time interval between a transmitted search signal and a received echo signal is a function of range comprising, a plurality of electronic counters, each having a storage register with a plurality of stable voltage states, indicator means to display visually each of said stable states, a first of said counters having an input for events to be counted, the remaining counters being serially intercoupled to measure complete cycles of different ones of said storage registers including that of said first counter, a separate single pole multitap switch coupled to each of said registers so that the signal voltage exclusively associated with each stable state appears at a separate tap, a coincidence gate means having a separate input coupled to the common pole of each of said switches for generating an index signal when said signal voltages appear simultaneously at said common poles, a timed generator of clock signals, a bistable gate coupling said timed generator to said input of said first counter, said bistable gate having an "on" input responsive to said transmitted echo pulse to open said gate and an "off" input coupled to said coincidence circuit to close said gate in response to said index pulse, and a mixing circuit means coupled to said coincidence gate to combine said index signal with said received echo signal.

2. The measurement system according to claim 1 including coupling means linking the switches to provide dependent manually controlled interaction therebetween.

3. The measurement system according to claim 2 wherein said search apparatus includes a range tracking servomotor and said coupling means includes differential means coupled to said servomotor whereby said switches may be operated simultaneously by automatic and manual control.

4. In a pulse-echo search system having a search signal transmitter, an echo signal receiver, and means to display along a time axis the transmitter signal and the received echo signal, means for accurately measuring the time difference between said signals comprising, a source of clock pulses, divider means coupled to said source to count the total number of said clock pulses, switch means to store a preselected number, a coincidence circuit means coupled to said divider means and said switch means to generate an index signal when said total number and said preselected number coincide, and signal mixing means for combining said index signal and said echo signal.

References Cited by the Examiner

UNITED STATES PATENTS

| | | | |
|---|---|---|---|
| 2,433,385 | 12/1947 | Miller | 340—3 |
| 2,702,367 | 2/1955 | Ergen | 343—13 |
| 2,742,639 | 4/1956 | Moore | 343—13 |
| 2,854,662 | 9/1958 | Westwood | 343—13 |

CHESTER L. JUSTUS, *Primary Examiner.*

FREDERICK M. STRADER, *Examiner.*

R. A. KUYPERS, R. D. BENNETT, *Assistant Examiners.*